(12) United States Patent
Kanamori

(10) Patent No.: US 12,095,957 B2
(45) Date of Patent: Sep. 17, 2024

(54) INFORMATION PROCESSING APPARATUS HAVING WEB SERVER COMMUNICATION, INFORMATION PROCESSING METHOD, AND STORAGE MEDIUM

(71) Applicant: CANON KABUSHIKI KAISHA, Tokyo (JP)

(72) Inventor: Hideyuki Kanamori, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/083,752

(22) Filed: Dec. 19, 2022

(65) Prior Publication Data

US 2023/0208989 A1   Jun. 29, 2023

(30) Foreign Application Priority Data

Dec. 28, 2021   (JP) .................. 2021-214410

(51) Int. Cl.
*H04N 1/00*   (2006.01)
*H04N 1/44*   (2006.01)

(52) U.S. Cl.
CPC ..... *H04N 1/00501* (2013.01); *H04N 1/00244* (2013.01); *H04N 1/00464* (2013.01); *H04N 1/00938* (2013.01); *H04N 1/4426* (2013.01); *H04N 1/4433* (2013.01); *H04N 1/00323* (2013.01); *H04N 1/00477* (2013.01)

(58) Field of Classification Search
CPC ........... H04N 1/00501; H04N 1/00244; H04N 1/00464; H04N 1/00938; H04N 1/4426; H04N 1/4433; H04N 1/00323; H04N 1/00477
See application file for complete search history.

(56) References Cited

U.S. PATENT DOCUMENTS

| | | | | |
|---|---|---|---|---|
| 2008/0120610 | A1* | 5/2008 | Katano | G06F 21/608 717/168 |
| 2010/0058064 | A1* | 3/2010 | Kirovski | H04L 63/0823 713/176 |
| 2021/0258300 | A1* | 8/2021 | Eriksson | H04L 63/0823 |

FOREIGN PATENT DOCUMENTS

JP   2019-049799 A   3/2019

OTHER PUBLICATIONS

Machine Translated Document (Matsuda et al. JP2016029848, Published Mar. 3, 2016) (Year: 2016).*

* cited by examiner

*Primary Examiner* — Juan M Guillermety
(74) *Attorney, Agent, or Firm* — VENABLE LLP

(57) ABSTRACT

An information processing apparatus is communicable with a web server to provide a web page, and obtains a certificate of the web server, verifies the certificate, and controls, in a case that verification of the certificate is successful, to establish secure communication with the web server and display a first screen which represents first information received from the web server via the secure communication. In a case the verification of the certificate is not successful, unsecure communication with the web server is established, and a second screen which is different from the first screen is displayed and represents second information received from the web server via the unsecure communication.

29 Claims, 14 Drawing Sheets

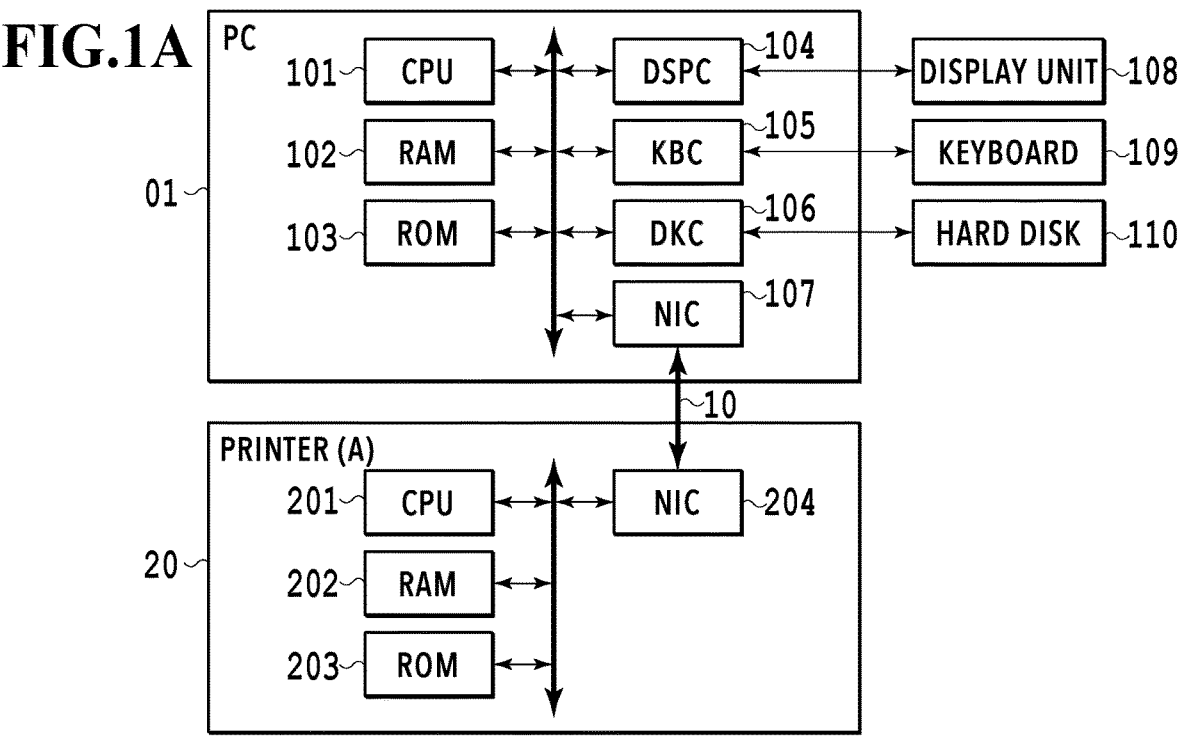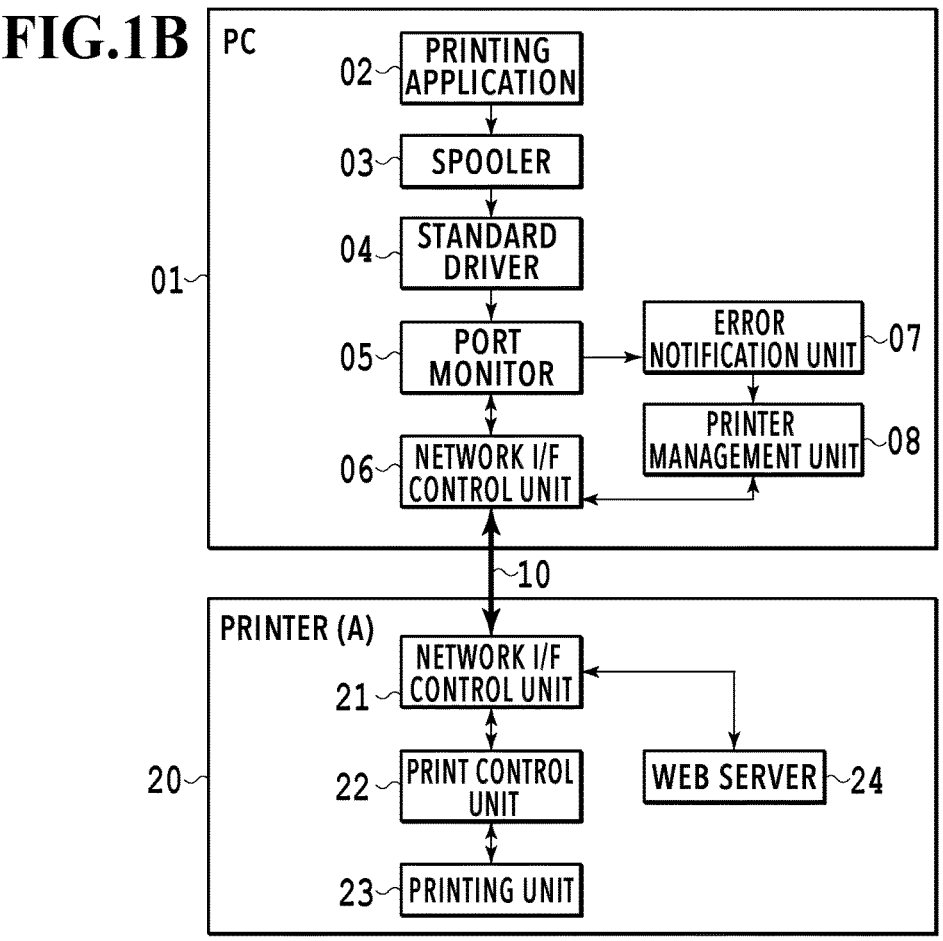

INFORMATION PROCESSING APPARATUS HAVING WEB SERVER COMMUNICATION, INFORMATION PROCESSING METHOD, AND STORAGE MEDIUM

BACKGROUND OF THE INVENTION

Field

The present disclosure relates to a technique for establishing communication with a web server.

Description of the Related Art

In recent years, web servers have been adapted to communication involving a safe procedure such as authentication of a communication partner and encryption of contents (hereinafter referred to as secure communication), and typically employs client software and Transport Layer Security (TLS) for the communication.

According to Japanese Patent Laid-Open No. 2019-49799 (hereinafter referred to as Reference 1), client software is used for verifying a communication partner by obtaining a certificate from a web server, and for encrypting communication data by generating a common key. In case there is a problem with verification of the server certificate obtained from the web server, the communication is interrupted and a window indicating an alert is displayed to a user. Then, the general client software continues interruption of the communication in the case of the problem with the verification of the server certificate unless the user confirms the alert.

SUMMARY

There is a demand for further improvement of convenience in the configuration to use the server certificate.

An information processing apparatus according to an aspect of the present disclosure is an information processing apparatus being communicable with a web server configured to provide a web page being capable of accepting instructions to control a printing apparatus, including: a first obtaining unit configured to obtain a certificate of the web server; a verifying unit configured to verify the certificate; and a communicating unit configured to establish secure communication with the web server in a case where the verifying unit succeeds in verification and to establish unsecure communication with the web server in a case where the verifying unit fails in the verification.

Further features of the present disclosure will become apparent from the following description of exemplary embodiments with reference to the attached drawings.

BRIEF DESCRIPTION OF THE DRAWINGS

FIGS. 1A and 1B are diagrams showing an overall configuration of a printing system;

DESCRIPTION OF THE EMBODIMENTS

Figure 2:
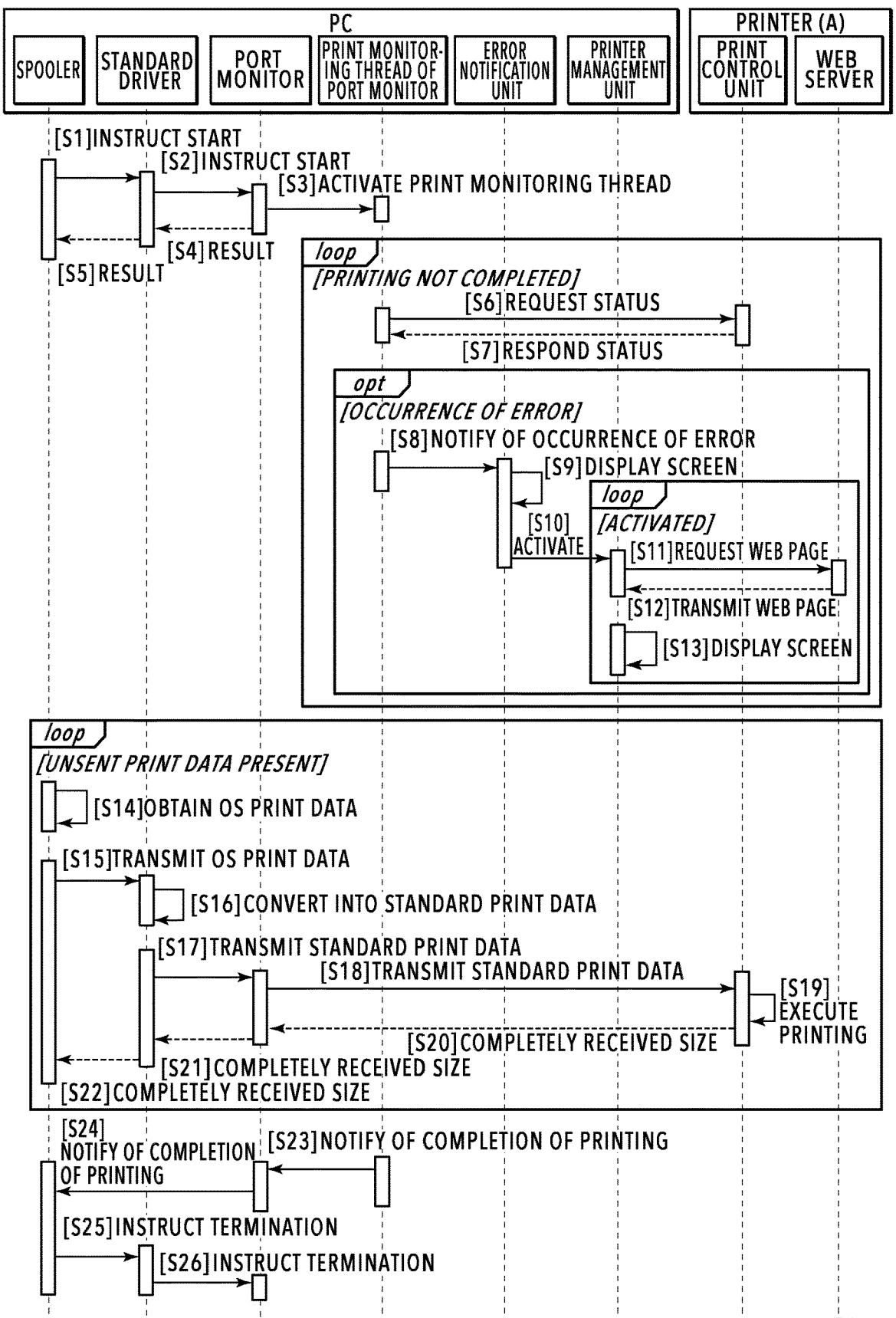
FIG. 2 is a diagram showing a processing sequence of a print job.

Preferred embodiments of the present disclosure will be described below in detail with reference to the accompanying drawings. It is to be understood that the following embodiments are not intended to limit the present disclosure as defined in the appended claims. It is to be also noted that a combination of all of the features described in each embodiment are not always essential for a solution of the present disclosure.

There has heretofore been client software configured to operate on a PC and obtain resources such as a Hypertext Markup Language (HTML) file and an image file from a web server and to display the resources on a window. The client software communicates with the web server by using the Hypertext Transfer Protocol (HTTP). Moreover, upon request for a resource designated with Uniform Resource Locator (URL), the web server provides the client software with the designated resource. Thereafter, the client software analyzes the resource provided from the web server. Then, the client software displays the analyzed resource on the window or requests specific processing from the web server in accordance with an operation on the window by a user.

In the case where the client software verifies a server certificate obtained from the web server and finds a problem, the client software interrupts the communication and issues an alert to the user. For example, in a case of a failure to verify a signature on the server certificate or in a case of expiration of the certificate, the client software displays a message on the window to indicate that there is a problem on the web server of a communication partner, which may lead to possible information leakage.

However, the client software will keep on interrupting the communication unless the user confirms the alert. As a consequence, the client server may fail to sufficiently support the user, who does not confirm the alert, by providing an alternative procedure and the like.

Given the circumstances, a description will be given below of a method of establishing communication by using an alternative procedure if there is the problem with verification of the server certificate of the web server in the case where the client software obtains the resource from the web server.

Embodiment 1

FIGS. 1A and 1B are diagrams showing an overall configuration of a printing system. FIG. 1A is a diagram showing a hardware configuration of a PC and a printer. A PC 01 and a printer 20 are connected through a communication interface 10, thereby being communicable with each other. Although a network is assumed to be a local area network (LAN) in the present embodiment, the network may be a wide area network (WAN) instead. In the meantime, a mode of network connection does not make any distinction whether it is wired, wireless, or formed by a combination thereof.

An operating system (OS) is installed on the PC 01. Respective constituents in the PC 01 are managed by the OS. Here, the PC 01 has a hardware configuration provided to a general information processing apparatus. To be more precise, the PC 01 includes a CPU 101, a RAM 102, a ROM 103, a display controller (DSPC) 104, a keyboard controller (KBC) 105, a disk controller (DKC) 106, and a network interface card (NIC) 107. Meanwhile, the DSPC is coupled to a display unit 108, the KBC is coupled to the keyboard 109, and the DKC is coupled to a hard disk 110, respectively.

The CPU 101 executes programs such as the OS and applications either stored in a program ROM of the ROM 103 or loaded from the hard disk 110 into the RAM 102. Processing of each of flowcharts to be described later can be implemented by executing such a program. The RAM 102 also functions as a main memory, a work area, and the like for the CPU 101. In the present embodiment, the OS installed on the PC 01 is assumed to be Windows 10 (registered trademark). The DSPC 104 controls display on the display unit 108. The KBC 105 controls inputted data from a keyboard (KB) 109. The DKC 106 controls data access to the hard disk 110 that stores various data. The NIC 107 controls exchange of signals with the printer 20 connected through the network.

The printer 20 includes a CPU 201, a RAM 202, a ROM 203, and a NIC 204. The RAM 202 functions as a work area for the CPU 201. The CPU 201 loads programs stored in the ROM 203 into the RAM 202 and executes the programs.

FIG. 1B is a diagram showing functional blocks of the PC and the printer. The PC 01 controls the printer 20 that is coupled through the communication interface 10. The PC 01 is formed from a printing application 02, a spooler 03, a standard driver 04, a port monitor 05, a network interface (I/F) control unit 06, an error notification unit 07, and a printer management unit 08. The spooler 03 carries out sequential processing while managing print jobs with the OS. The standard driver 04 is a standard driver that can be used in common by printing apparatuses provided by multiple vendors. The standard driver 04 converts print data that requires a printer driver unique to the OS into standard print data by using Internet Print Protocol (IPP). The port monitor 05 transmits the standard print data to the printer, and obtains a status from the printer. The network I/F control unit 06 controls a network device. The error notification unit 07 notifies a user of the occurrence of an error. The printer management unit 08 guides a mode of resetting the error at the time of the occurrence of the error in the printer 20. The printer management unit 08 also performs maintenance and various settings of the printer 20.

In the case where the user requests printing of data created with the printing application 02, the request is inputted together with the print data unique to the OS into the spooler 03 collectively as a print job. In the present embodiment, the print data unique to the OS is assumed to be data in a format according to XML Paper Specification (XPS), which is a page description language adopted by Windows. The spooler 03 manages received jobs in a print queue, and retrieves and processes the jobs one by one.

The spooler 03 retrieves the print job from the print queue and transmits the print data unique to the OS to the standard driver 04. The standard driver 04 converts the received print data unique to the OS into the standard print data, and transmits the converted data to the port monitor 05. In the present embodiment, print data in the PWG Raster format is assumed to be the OS standard print data. The port monitor 05 transmits the standard print data to the printer 20 through the network I/F control unit 06, and receives the status from the printer 20. If there is an error, the port monitor 05 notifies the error notification unit 07 thereof. The error notification unit 07 activates the printer management unit 08 in response to an operation by the user. The printer management unit 08 obtains and displays a web page (hereinafter referred to as a printer management web page), which is used for checking the status of the printer or conducting maintenance thereof, from the printer 20 through the network I/F control unit 06.

The printer 20 includes a network I/F control unit 21, a print control unit 22, a printing unit 23, and a web server 24. In the case where the print control unit 22 receives the standard print data from the PC 01 through the network I/F control unit 21, the print control unit 22 prints the standard print data on an output sheet by controlling the printing unit 23. In the case where the print control unit 22 receives a status request through the network I/F control unit 21, the print control unit 22 transmits a status response to the PC 01 based on a state of print processing. In the case where the web server 24 receives a request to obtain the printer management web page from the PC 01 through the network I/F control unit 21, the web server 24 sends the PC 01 the printer management web page of the designated URL. The web server 24 of the present embodiment is incorporated in the printer 20 and is capable of checking the status or a setting condition and the like of the printer 20 from an external device through the printer management web page provided by the web server 24. Here, the web server 24 may be provided on the outside of the printer 20 instead.

FIG. 2 is a diagram showing a processing sequence of a print job. Of a series of processing shown in this sequence, processing in the PC 01 such as the error notification unit or the printer management unit of the PC is carried out by causing the CPU 101 of the PC 01 to load program codes stored in the ROM 103 into the RAM 102 and to execute the program codes. Meanwhile, processing in the printer 20 such as processing by the print control unit and the like of the printer 20 is carried out by causing the CPU 201 of the printer to load program codes stored in the ROM 203 into the RAM 202 and to execute the program codes. A code "S" in the following description of each processing means a step in a relevant flowchart. The same applies to other embodiments to follow.

In the case where processing for a print job is started in S1, the spooler 03 sends a print start instruction to the standard driver 04. In S2, the standard driver 04 initializes various parameters used in the print processing or secures a memory, and sends the print start instruction to the port monitor 05. In S3, the port monitor 05 initializes various parameters used in the print processing or secures a memory, and then activates a thread for monitoring a state of the print processing of the printer 20. Thereafter, in S4, the port monitor 05 returns a result of the start processing to the standard driver 04. In S5, upon receipt of the result of the start processing from the port monitor 05, the standard driver 04 returns this result to the spooler 03 together with a result of the start processing of its own.

In the print monitoring thread of the port monitor 05, the port monitor 05 periodically transmits the status request to the print control unit 22 of the printer 20 in S6. In S7, the print control unit 22 returns a response to the status request to the port monitor 05 of the PC 01. In the case where the port monitor 05 determines in S8 that there is an error occurring in the printer 20 based on the status response obtained from the print control unit 22, the port monitor 05 notifies the error notification unit 07 thereof. Upon receipt of notification regarding the occurrence of the error, the error notification unit 07 displays an error notification screen on the display unit 108 in S9. The error notification screen displayed by the error notification unit 07 will be described later. In the case where another error notification screen has already been displayed, the error notification unit 07 displays the latest error notification screen on the foreground.

In S10, the error notification unit 07 activates the printer management unit 08 in accordance with an operation by the user on the error notification screen. In S11, the printer management unit 08 requests the printer management web page from the web server 24 included in the printer 20. In this instance, communication is encrypted or a communication partner is authenticated by using a server certificate to be described later. In S12, the web server 24 returns the printer management web page to the printer management unit 08 in response to the request therefrom. Here, the web page to be returned from the web server 24 to the printer management unit 08 is a web page that varies depending on a result of verification of the server certificate. Details of the web page will also be described later. In S13, the printer management unit 08 displays a printer management screen on the display unit 108. Then, the printer management unit 08 displays the printer management web page on the printer management screen. The printer management screen as well as a flow of causing the printer management unit 08 to display the printer management web page will be described later. In the case where the printer management unit 08 has already been activated, the printer management unit 08 displays the printer management screen, which is displayed on its own, on the foreground. Based on the status response obtained from the print control unit 22, the port monitor 05 obtains the status response from the print control unit 22 while the print processing is not completed, or repeats the error occurrence notification in the case of the occurrence of the error. The printer management web page displayed on the printer management screen by the printer management unit 08 is set to be periodically reloaded. While the printer management screen is displayed, the latest status of the printer is displayed thereon.

Upon receipt of the result of the print start processing in S5, the spooler 03 sequentially obtains print data unique to the OS in S14, which are inputted as the print job by the printing application 02. In S15, the spooler 03 transmits the print data to the standard driver 04. In S16, the standard driver 04 converts the print data unique to the OS into the standard print data. In S17, the standard driver 04 transmits the standard print data to the port monitor 05. In S18, the port monitor 05 transmits the standard print data to the print control unit 22 included in the printer 20.

In S19, the print control unit 22 executes printing by controlling the printing unit 23. In S20, the print control unit 22 returns a size of the standard print data, which is completely received, to the port monitor 05. In S21, the port monitor 05 returns, based on the size of the standard print data which is completely received by the print control unit 22, the completely received size addressed to a sender of each print data to the standard driver 04. In S22, the standard driver 04 returns the completed received size addressed to the sender of each print data to the spooler 03. The spooler 03 sequentially obtains the print data unique to the OS and repeats transmission thereof while there are print data yet to be transmitted.

In the case where the spooler 03 transmits all of the print data unique to the OS and execution of the printing by the print control unit 22 is completed, the print monitoring thread of the port monitor 05 detects completion of execution of the printing by using the status response obtained from the print control unit 22. Then, in S23, the print monitoring thread of the port monitor 05 notifies the port monitor 05 of completion of the printing. In S24, the port monitor 05 notifies the spooler 03 of completion of the printing. In S25, the spooler 03 sends a printing termination instruction to the standard driver 04. In S26, the standard driver 04 sends the printing termination instruction to the port monitor 05. The standard driver 04 and the port monitor 05 carry out termination processing such as release of memory areas used for the print processing and so forth, thereby terminating the print processing.

Figure 3:
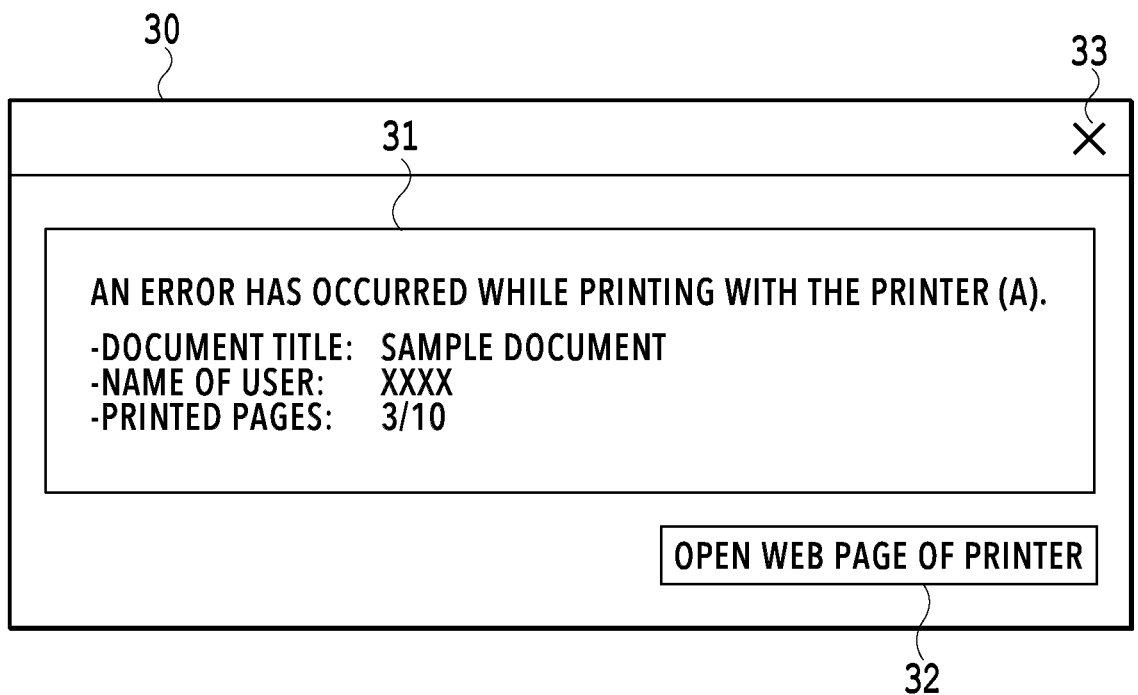
FIG. 3 is a diagram showing an error notification screen displayed by an error notification unit.

FIG. 3 is a diagram showing the error notification screen displayed by the error notification unit 07. Upon receipt of the notification of the occurrence of the error from the port monitor 05 in S8 of FIG. 2, the error notification unit 07 displays an error notification screen 30 in S9. The error notification unit 07 displays a message regarding the occurrence of the error, a title of a document being printed as well as a name of the user, and the number of pages being processed as well as a total number of pages collectively as printed pages in an error display area 31. In a case where the user presses an "open web page of printer" button 32, the error notification unit 07 activates the printer management unit 08 in S10 in FIG. 2, whereby the printer management unit 08 displays the printer management screen. The printer management screen will be described later. In the case where the printer management unit 08 has already been activated, the printer management unit 08 displays the printer management screen on the foreground. In the case where the user presses a "close (x)" button 33, the error notification unit 07 closes the error notification screen 30.

FIGS. 4A to 5B are diagrams showing the printer management screens displayed by the printer management unit 08. The printer management unit 08 is activated in the case where the user presses the "open web page of printer" button 32 on the error notification screen 30 shown in FIG. 3. The printer management unit 08 displays a printer management screen 40. In the case where the printer management unit 08 has already been activated and has displayed another printer management screen 40, the printer management unit 08 displays the latest printer management screen 40 on the foreground. In the case where the user presses a "close" button 41, the printer management unit 08 closes the printer management screen 40 and terminates the processing.

The printer management unit 08 displays the printer management web page, which is obtained from the web server 24 of the printer 20, in a web page display area 42. In the present embodiment, the web server 24 of the printer 20 has a function to provide different printer management web pages between secure communication and unsecure communication (communication that does not involve authentication of the communication opponent or encryption of communication contents). In the case of using the secure communication, the web server 24 not only checks the status of the printer but also provides a complete version of the printer management web page that also enables maintenance of the printer or setting of an operation mode. On the other hand, in the case of using the unsecure communication, the web server 24 provides a simplified version of the printer management web page that enables checking of the status of the printer. In other words, the web page display area 42 on the printer management screen 40 displays the complete version of the web page in the case of the secure communication or the simplified version of the web page in the case of the unsecure communication, respectively.

FIGS. 4A to 5B are diagrams each showing the printer management screen 40 in the case where the complete version of the printer management web page is displayed in the web page display area 42. The web server 24 provides "display status", "display ink levels", "execute maintenance", and "set operation mode" functions on the complete version of the printer management web page, and displays these functions in a function list box 43.

Figure 4A:
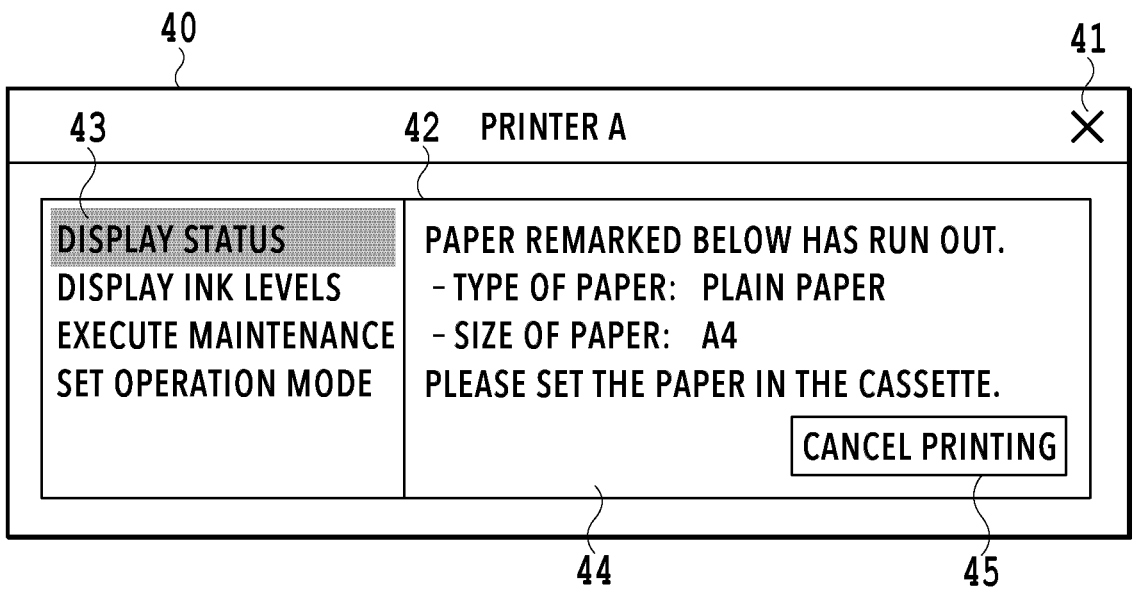
FIGS. 4A and 4B are diagrams showing printer management screens displayed by a printer management unit.

FIG. 4A shows the printer management screen 40 in the case where the user selects the "display status" function in the function list box 43. The web server 24 displays the status of the printer in a status information display area 44. In the case where the error is occurring, the web server 24 displays a detail of the error and a solution therefor. In the case where the error is not occurring, the web server 24 displays either a state of standby or a state of printing in progress. In the meantime, the web server 24 displays a "cancel printing" button 45 for cancelling the printing operation currently in progress.

Figure 4B:
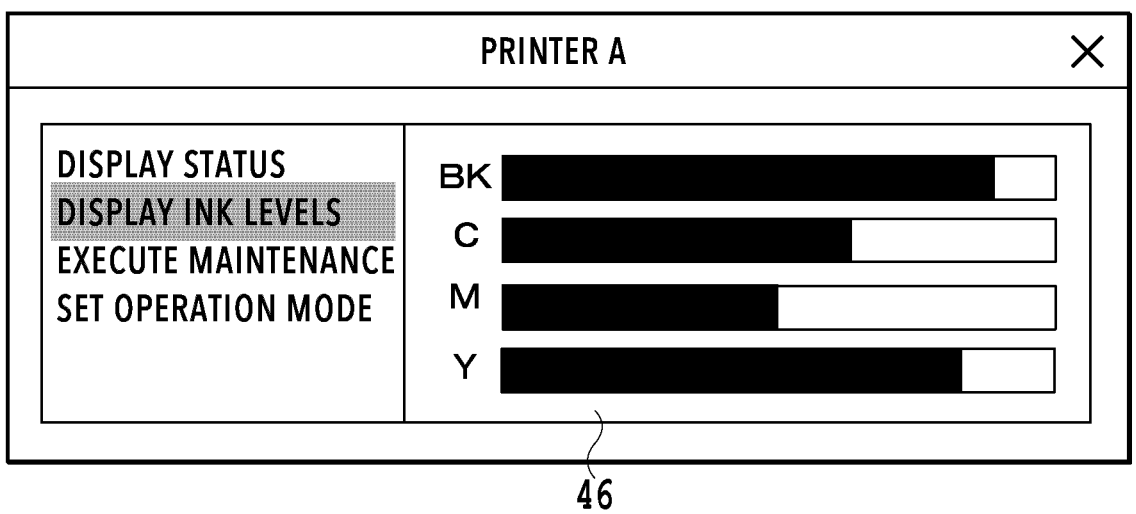

FIG. 4B shows the printer management screen 40 in the case where the user selects the "display ink levels" function in the function list box 43. The web server 24 displays remaining amounts of respective inks loaded in the printer in an ink level display area 46. In the present embodiment, the printer 20 loads black (BK), cyan (C), magenta (M), and yellow (Y) inks.

Figure 5A:
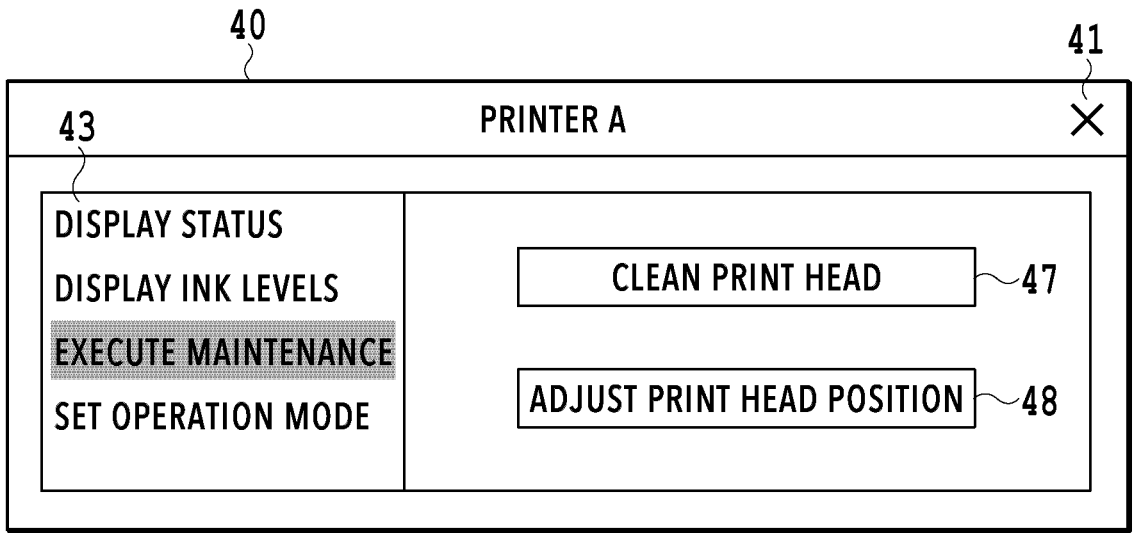
FIGS. 5A and 5B are diagrams showing printer management screens displayed by the printer management unit.

FIG. 5A shows the printer management screen 40 in the case where the user selects the "execute maintenance" function in the function list box 43. The web server displays a "clean printer head" button 47 for executing clearance of clogged inks, and an "adjust print head position" button 48 for executing improvement of displacement of a printing position.

Figure 5B:
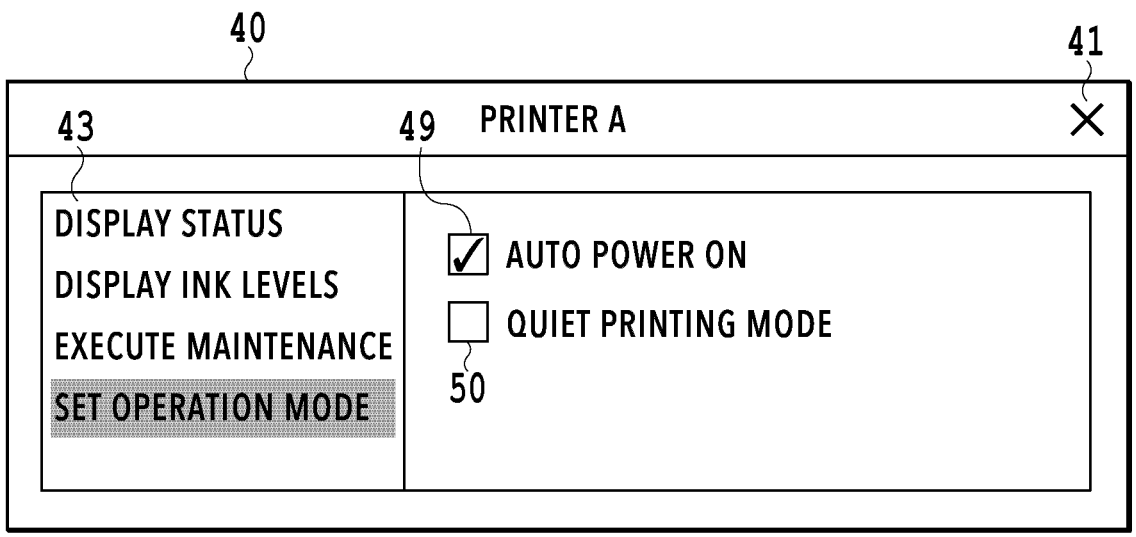

FIG. 5B shows the printer management screen 40 in the case where the user selects the "set operation mode" function in the function list box 43. The web server displays an "auto power on" checkbox 49 for setting in such a way as to automatically turn power on in a case where the printer receives print data, and a "quiet printing mode" checkbox 50 for setting in such a way as to reduce operating sounds while the printer performs printing.

In the case where the "display status" function or the "display ink levels" function is selected in the function list box 43, the web page provided by the web server 24 is set to be periodically reloaded. While the printer management unit 08 displays the printer management screen 40, these web pages are periodically updated so as to display the status or the ink levels based on the latest conditions either in the status information display area 44 or in the ink level display area 46.

Figure 6A:
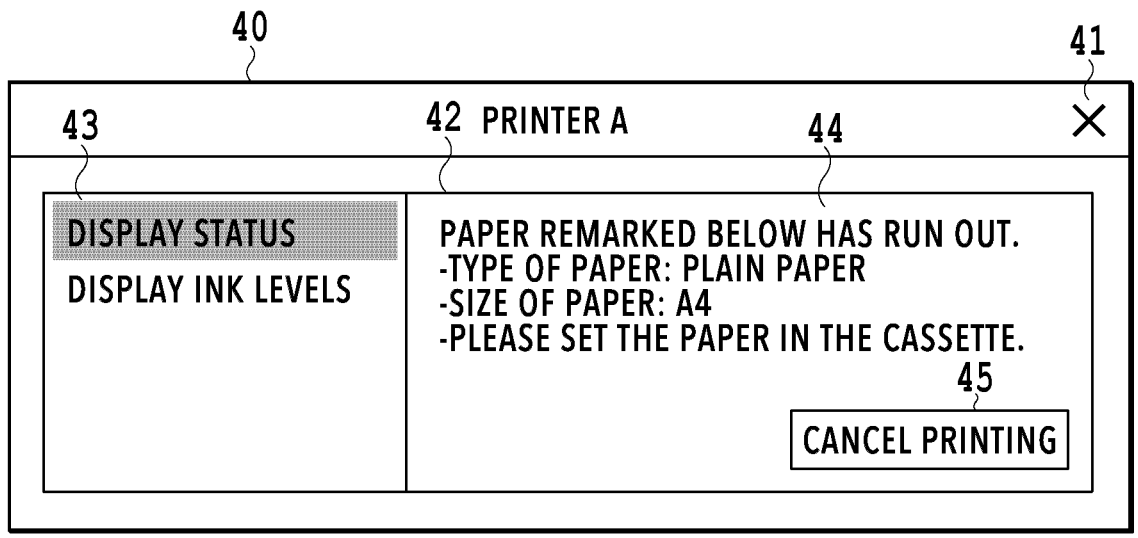
FIGS. 6A and 6B are diagrams showing printer management screens displayed by the printer management unit.
Figure 6B:
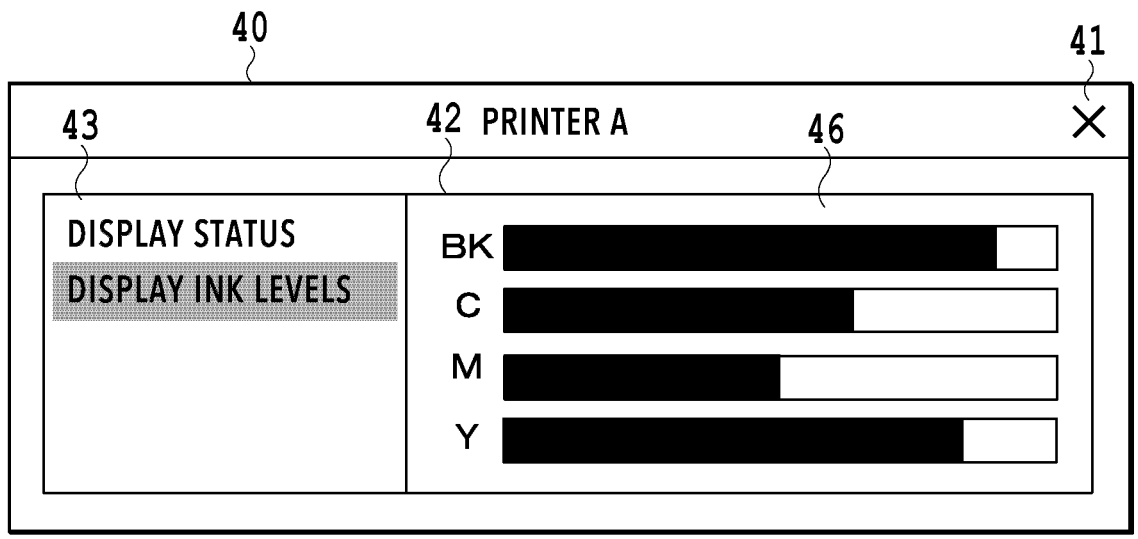

FIGS. 6A and 6B are diagrams each showing the printer management screen 40 in the case where the simplified version of the printer management web page is displayed in the web page display area 42. FIG. 6A shows the printer management screen 40 in the case where the user selects the "display status" function in the function list box 43. Meanwhile, FIG. 6B shows the printer management screen 40 in the case where the user selects the "display ink levels" function in the function list box 43. Specifically, the web server 24 provides the "display status" function and the "display ink levels" function on the simplified version of the printer management web page, and displays these functions in the function list box 43. Here, unlike the complete version of the printer management web page, the "execute maintenance" function and the "set operation mode" function are deleted from the function list box 43 in the simplified version of the printer management web page. In other words, in the simplified version of the printer management web page, it is not possible to conduct the settings of the functions that may result in changes in functional configurations. Instead, it is possible to use simple functions such as the functions to check the display of the status and so forth. The operations on the printer management screens 40 in the case where the user selects these functions are the same as those on the complete version of the printer management web page.

Figure 7:
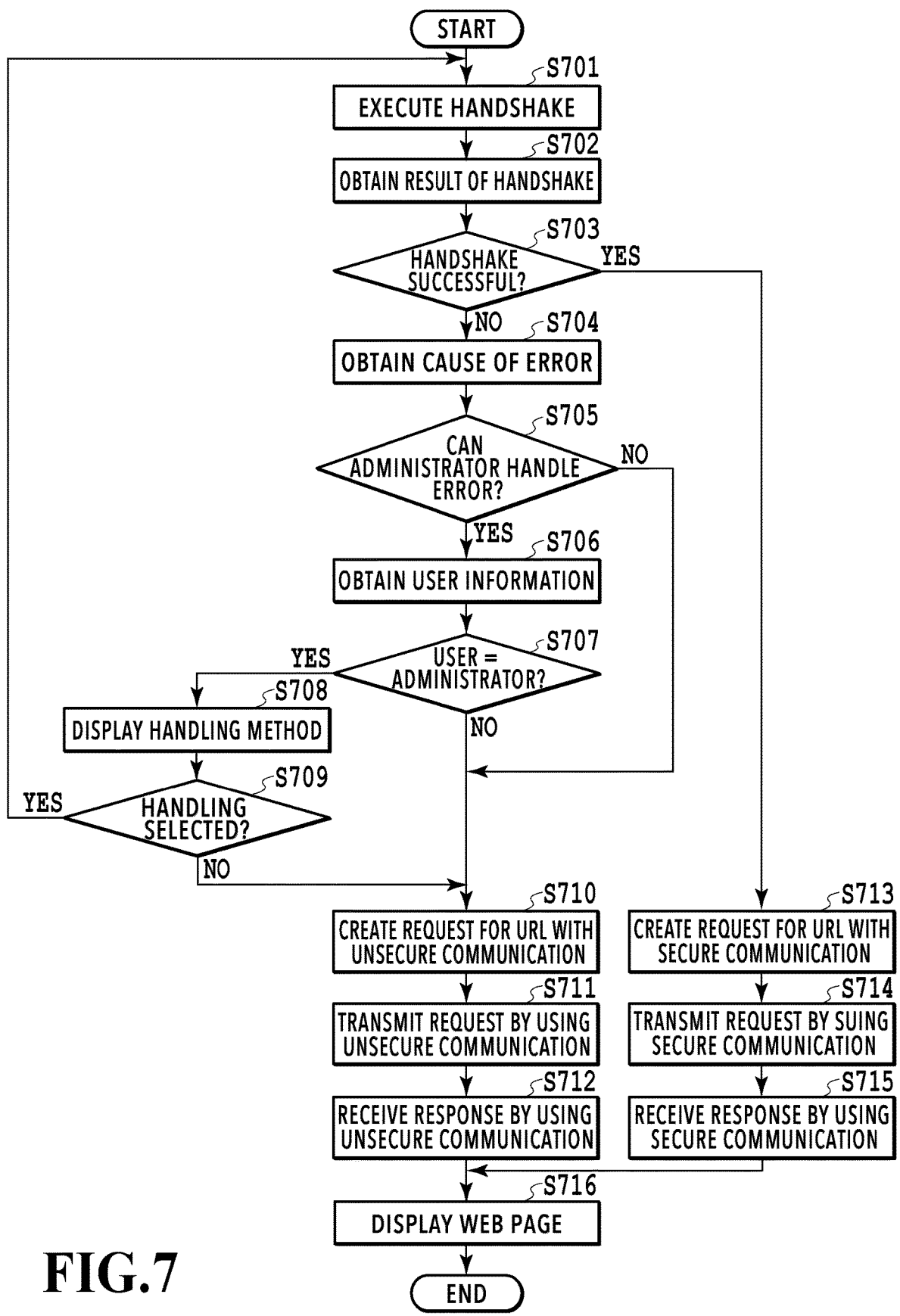
FIG. 7 is a diagram showing a flow in which the printer management unit displays a printer management web page.

FIG. 7 is a diagram showing a flow in which the printer management unit 08 displays the printer management web page. In the case where the error notification unit 07 activates the printer management unit 08, the printer management unit 08 executes processing in accordance with this flow. A series of processing shown in this flowchart is implemented by causing the CPU 101 of the PC 01 to load the program codes stored in the ROM 103 into the RAM 102 and to execute the program codes.

In S701, the printer management unit 08 executes a handshake in order to establish the secure communication with the web server 24 included in the printer 20. In the present embodiment, a protocol for the secure communication is assumed to be the TLS, and the printer management unit 08 authenticates the communication partner and exchanges keys for encrypting the communication data by means of the handshake. Here, a web certificate used for the TLS is assumed to be obtained from the printer 20 in advance.

The printer management unit 08 obtains a result of the handshake in S702. The printer management unit 08 determines whether or not the handshake is successful in S703. The processing proceeds to S713 in the case where the handshake is determined to be successful in this step. On the other hand, the processing proceeds to S704 in the case where the handshake is determined to be unsuccessful due to the occurrence of an error and the like. In S713, the printer management unit 08 creates an HTTP request designating the URL of the complete version of the printer management web page that can be obtained by the secure communication. In S714, the printer management unit 08 transmits the created request to the web server 24 by using the secure communication. In S715, the printer management unit 08 receives the complete version of the printer management web page as a response to the request. In S716, the printer management unit 08 displays the complete version of the printer management web page thus received on the printer management screen 40, and then terminates this flow.

In S704, the printer management unit 08 obtains a cause of the error. In S705, the printer management unit 08 determines whether or not an administrator can handle the error. In the present embodiment, in the case of the error indicating that the web certificate for authenticating the web server 24 is not correctly installed, the printer management unit 08 determines that the administrator can handle the error by installing the web certificate. On the other hand, in the case of the error indicating that the web certificate is expired, the printer management unit 08 determines that the administrator cannot handle the error. The processing proceeds to S706 in the case of the determination that the administrator can handle the error in this step, or proceeds to S710 in the case of the determination that the administrator cannot handle the error.

In S706, the printer management unit 08 executes an operation to obtain account information from the printer 20. Meanwhile, in S707, the printer management unit 08 checks an account type from the obtained account information, thereby determining whether or not the account of the user represents the administrator. The processing proceeds to S710 in the case where the account is determined not to represent the administrator, or proceeds to S708 in the case where the account is determined to represent the administrator. In S708, the printer management unit 08 displays an error handling method guidance screen on the display unit 108.

Figure 8:
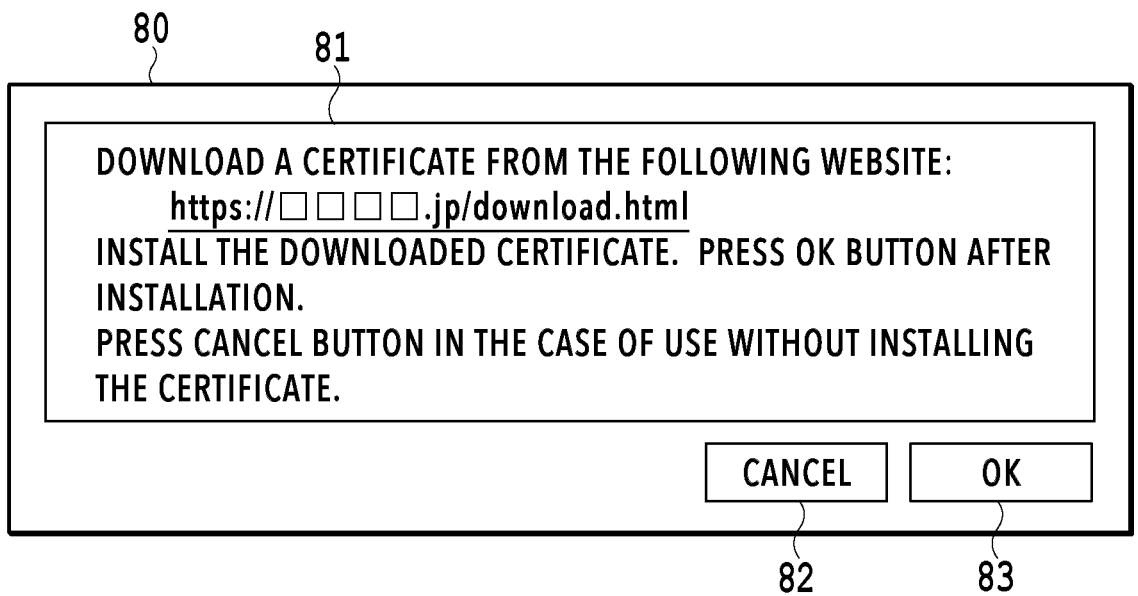
FIG. 8 is a diagram showing an error handling method guidance screen displayed by the printer management unit.

FIG. 8 is a diagram showing an error handling method guidance screen 80 displayed by the printer management unit 08. In the present embodiment, a handling method guidance message including the URL of a download destination for the web certificate is displayed in a message display area 81 in the case where the web certificate for authenticating the web server 24 is not correctly installed.

In S709, the printer management unit 08 determines whether or not the user has handled the error. In the case where the user installs the web certificate and presses an "OK" button 83 on the error handling method guidance screen 80, the printer management unit 08 determines that the user has handled the error. In this case, the processing returns to S701 where the handshake is executed again so as to carry out the authentication of the communication partner and so forth.

On the other hand, in the case where the user presses a "cancel" button 82 without installing the web certificate, the printer management unit 08 determines that the user has selected not to handle the error. The processing proceeds to S710 in this case.

In S710, the printer management unit 08 creates an HTTP request designating the URL of the simplified version of the printer management web page that can be obtained by the unsecure communication. In S711, the printer management unit 08 transmits the created request to the web server 24 by using the unsecure communication. In S712, the printer management unit 08 receives the simplified version of the printer management web page as a response to the request.

In S716, the printer management unit 08 displays the simplified version of the printer management web page thus received in the web page display area 42 on the printer management screen, and then terminates this flow.

In the present embodiment, the printer management unit 08 obtains the printer management web page from the web server 24 of the printer 20 and displays the printer management web page on the display unit 108. However, the present disclosure is not limited only to this configuration in reality. For example, the printer management unit 08 may activate a web browser by designating the URL of the printer management web page and display the printer management web page on a screen of the web browser. In this case, the printer management unit 08 designates the URL of either the complete version of the printer management web page or the simplified version of the printer management web page on the web browser and displays the web page thereon depending on a result of verification of the web certificate for the web server 24 of the printer 20.

As described above, according to the present embodiment, it is possible to provide an alternative procedure depending on the result of verification of the web certificate. To be more precise, the printer management unit 08 verifies the certificate for the web server 24 included in the printer 20 in advance, so that the printer management unit 08 can obtain and display the simplified web page by using the unsecure communication as the alternative procedure, which does not require the verification of the certificate, even in the case where there is a problem of the result of verification.

Embodiment 2

In the Embodiment 1, the printer management unit 08 first executes the handshake with the web server 24 of the printer 20, and then displays either the complete version of the printer management web page or the simplified version of the printer management web page depending on the result thereof. In Embodiment 2, the user is supposed to input an administrator password in the case of operating the complete version of the printer management web page. In this regard, the printer management unit 08 checks an account type of the user to begin with. In the case where the user is not the administrator, the printer management unit 08 displays the simplified version of the printer management web page instead of the complete version of the printer management web page that requires the input of the administrator password. Now, a description will be given below regarding processing of the present embodiment. Note that functional block diagrams of the PC and the printer in the present embodiment are the same as the functional blocks of the PC and the printer in the overall configuration of the printing system according to the Embodiment 1 shown in FIG. 1B. Moreover, the portions except the flow of causing the printer management unit 08 to display the web page display area on the printer management screen in the Embodiment 1 shown in FIG. 7 are the same in the present embodiment, and explanation will therefore be omitted.

In the present embodiment, the web server 24 included in the printer 20 provides a web page for inputting the administrator password (hereinafter referred to as an administrator password input web page) as a top page of the complete version of the printer management web page. Moreover, the web server 24 provides the complete version of the printer management web page of Embodiment 1 shown in FIGS. 4A to 5B after authenticating the administrator password.

Figure 9:
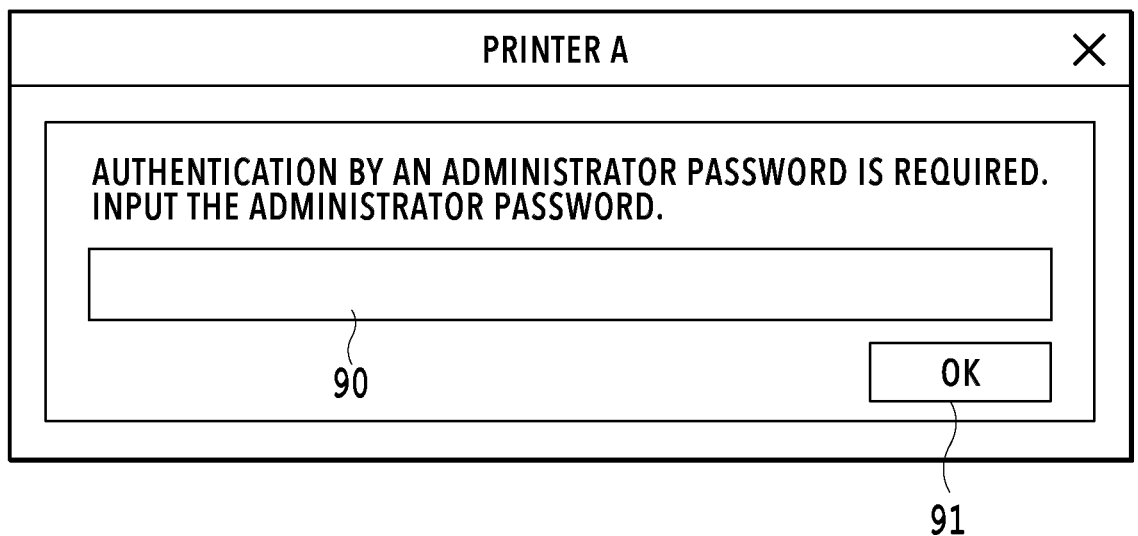
FIG. 9 is a diagram showing a printer management screen displayed by the printer management unit.

FIG. 9 is a diagram showing the printer management screen in the case where the administrator password input web page is displayed. In the case where the user inputs the correct administrator password in a password input area 90 and presses an "OK" button 91, the web server 24 provides the "display status", "display ink levels", "execute maintenance", and "set operation mode" functions shown in FIGS. 4A to 5B.

Figure 10:
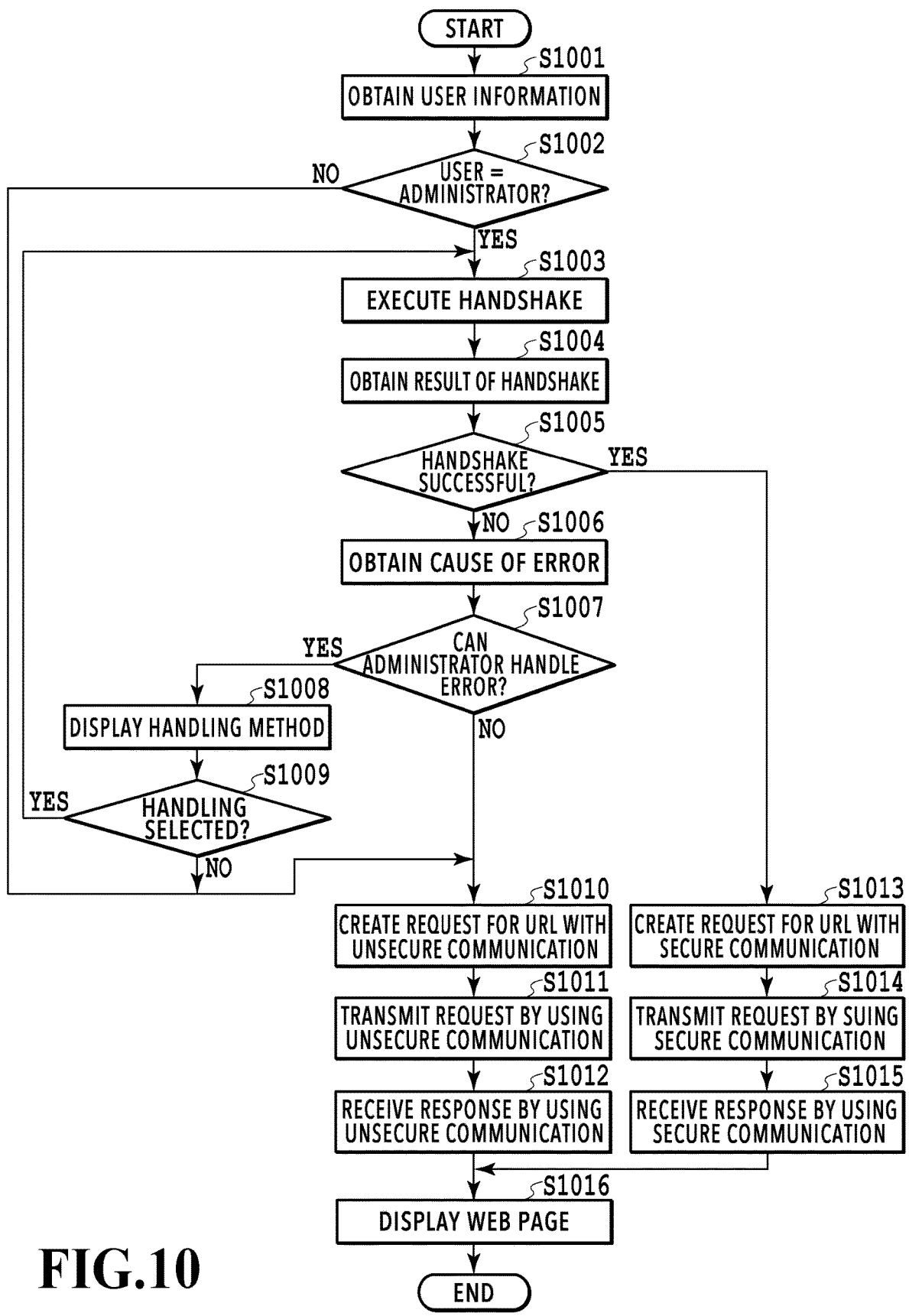
FIG. 10 is a diagram showing a flow in which the printer management unit displays a printer management web page.

FIG. 10 is a diagram showing a flow in which the printer management unit 08 displays the printer management web page in the present embodiment. As with the Embodiment 1, in the case where the error notification unit 07 activates the printer management unit 08, the printer management unit 08 executes processing in accordance with this flow.

The printer management unit 08 obtains the account information in S1001. In S1002, the printer management unit 08 checks the obtained account information and determines whether or not the account of the user represents the administrator. The processing proceeds to S1003 in the case where the account information is determined to represent the administrator, or proceeds to S1010 in the case where the account information is determined not to represent the administrator. Even in the case where the verification of the web certificate by the handshape is successful, the user who is not the administrator cannot correctly input the administrator password on the administrator password input web page. Accordingly, it is not necessary for the printer management unit 08 to obtain and display the administrator password input web page, which is the top page of the complete version of the printer management web page, by using the secure communication for the sake of the user who is not the administrator. The printer management unit 08 therefore does not execute the handshake unless the account of the user represents the administrator, and displays the simplified version of the printer management web page that can be obtained by using the unsecure communication in the web page display area 42 on the printer management screen 40.

In the case where the account of the user is determined to represent the administrator, the printer management unit 08 executes the handshake in order to establish the secure communication with the web server included in the printer 20 in S1003. Then, the printer management unit 08 obtains a result of the handshake in S1004. The processing proceeds to S1013 in the case where the handshake is successful, or proceeds to S1006 in the case of the occurrence of an error. In S1006, the printer management unit 08 obtains a cause of the error. In S1007, the printer management unit 08 determines whether or not the administrator can handle the error that has occurred. The processing proceeds to S1008 in the case of the determination that the administrator can handle the error, or proceeds to S1010 in the case of the determination that the administrator cannot handle the error. The processing from S1008 to S1015 is the same as the processing from S708 to S715 of the Embodiment 1, and explanations will therefore be omitted.

In S1016, the printer management unit 08 displays the web page that corresponds to any of the secure communication and the unsecure communication. In the case of the secure communication, the printer management unit 08 displays the administrator password input web page as the top page. Then, the printer management unit 08 displays the complete version of the printer management web page shown in FIGS. 4A to 5B on the condition that the authentication of the password is successful. In the case of the unsecure communication, the printer management unit 08 displays the simplified version of the printer management web page as with the Embodiment 1. Thereafter, this flow is terminated.

As described above, according to the present embodiment, the printer management unit 08 obtains the simplified version of the printer management web page, which does not require the input of the administrator password, by using the unsecure communication in the case where the account type of the user does not represent the administrator. Accordingly, this configuration has an effect that it is possible to provide the simplified version of the printer management web page to the user who is not the administrator without unnecessarily executing the handshape associated with the secure communication.

Embodiment 3

In the Embodiment 1, the printer management unit 08 executes the handshake with the web server 24 of the printer 20, and displays the simplified version of the printer management web page in the case of the occurrence of the error that cannot be handled by the user. The present embodiment assumes that the web server 24 of the printer 20 does not have the function to provide the simplified version of the printer management web page by using the unsecure communication. Here, the printer management unit 08 activates a status monitor having an equivalent function instead.

Accordingly, in the present embodiment, the web server 24 is assumed not to provide the simplified version of the printer management web page as shown in FIG. 6.

Functional block diagrams of the PC and the printer in the present embodiment are the same as the functional blocks of the PC and the printer in the overall configuration of the printing system according to the Embodiment 1 shown in FIG. 1B.

Figure 11:
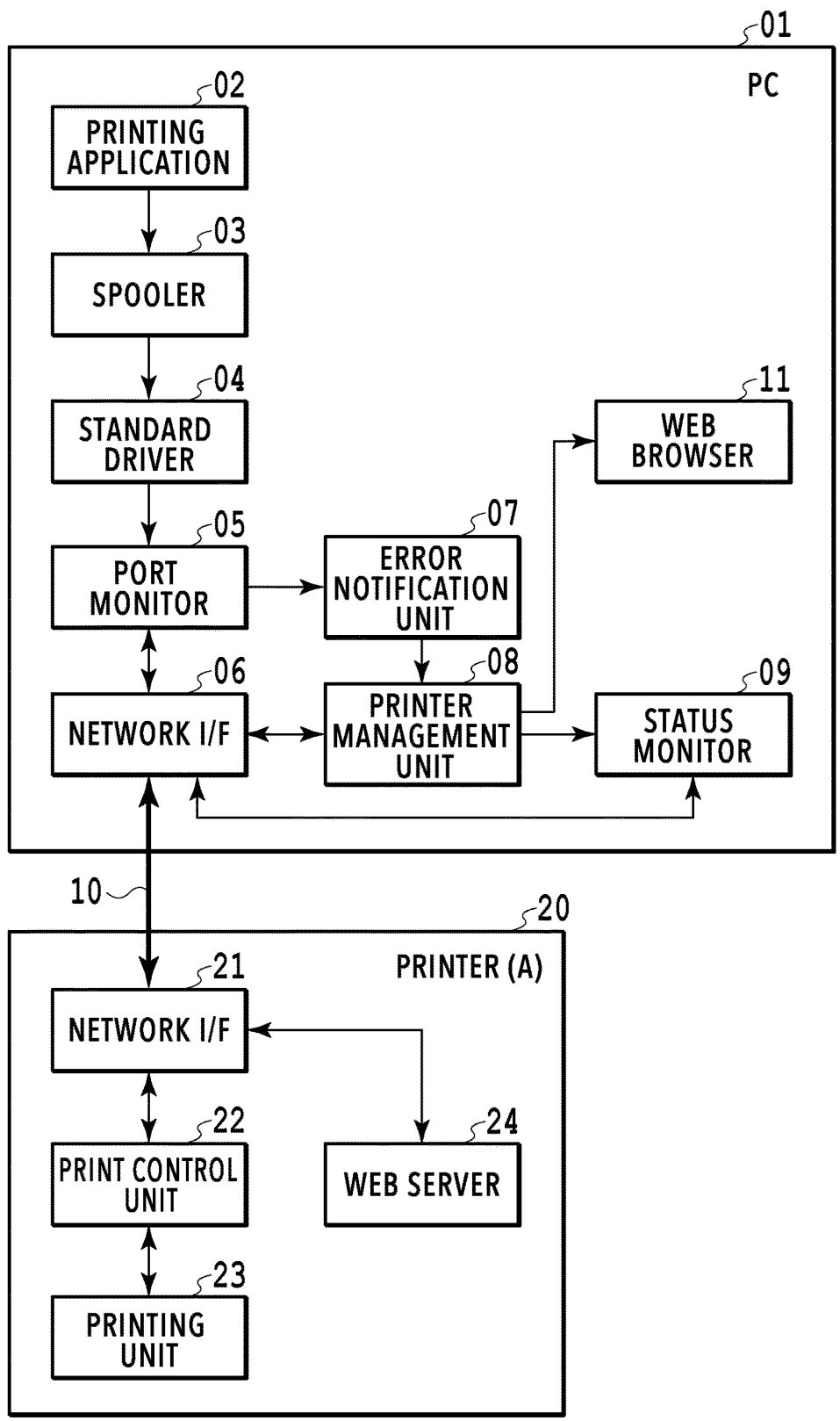
FIG. 11 is a diagram showing an overall configuration of a printing system.

FIG. 11 is a diagram showing an overall configuration of the printing system of the present embodiment. The PC 01 of the present embodiment includes a web browser 11 and a status monitor 09 in addition to the configuration according to the Embodiment 1. The printer management unit 08 activates the web browser 11 or the status monitor 09 as needed. The status monitor 09 is a local application that obtains the status of the printer 20 through the network I/F control unit 06 and displays a status screen shown in FIG. 12. The web browser 11 displays a web page for downloading the status monitor 09 (hereinafter referred to as a download web page). Details will be described later.

Figure 12:
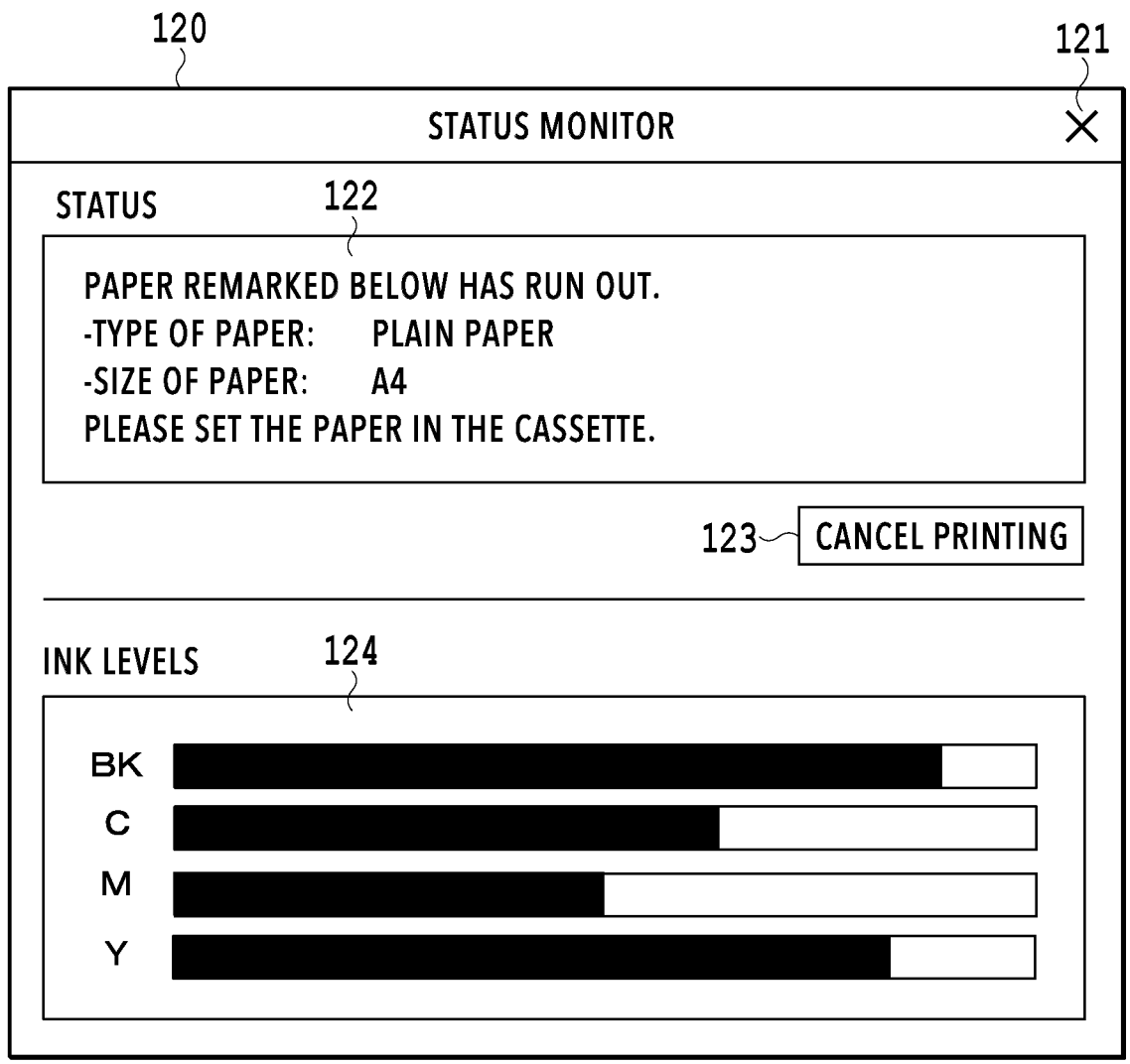
FIG. 12 is a diagram showing a status screen displayed on a status monitor.

FIG. 12 is a diagram showing a status screen displayed on the status monitor 09. The printer management unit 08 activates the status monitor 09 in the case where the complete version of the printer management web page cannot be obtained by using the secure communication. The printer management unit 08 activates the web browser 11 in the case where the status monitor 09 is not installed on the PC 01.

The status monitor 09 displays a status screen 120 in the case where the status monitor 09 is activated. In the case where the user presses a "close" button 121, the status monitor 09 closes the status screen 120 and terminates the processing. The status monitor 09 displays the status of the printer in a status display area 122 or displays remaining amounts of inks in an ink level display area 124 based on the status obtained from the printer 20. In the case where the user presses a "cancel printing" button 123, the status monitor 09 sends the printer 20 a command for instructing cancellation of printing, thereby cancelling the printing currently in progress.

Figure 13:
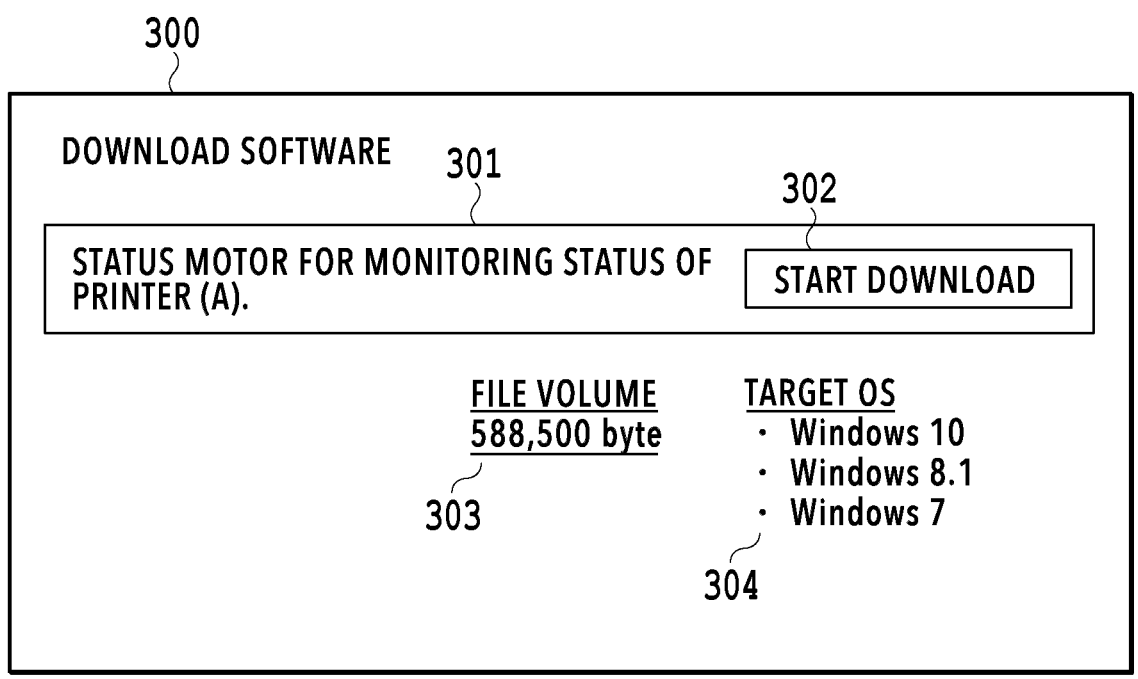
FIG. 13 is a diagram showing a web page for downloading the status monitor.

FIG. 13 is a diagram showing a download web page 300 to be displayed on the web browser 11. In the case where the status monitor 09 is not installed on the PC 01, the printer management unit 08 activates the web browser 11 by designating the URL on the download web page 300. The web browser 11 obtains the download web page 300 from the designated URL and displays the download web page 300. A description 301 of the status monitor, a "start download" button 302, a file volume information 303 of the status monitor, and target OS information 304 are displayed on the download web page 300. In the case where the user presses the "start download" button 302, the status monitor 09 is downloaded and installed on the PC 01.

Figure 14:
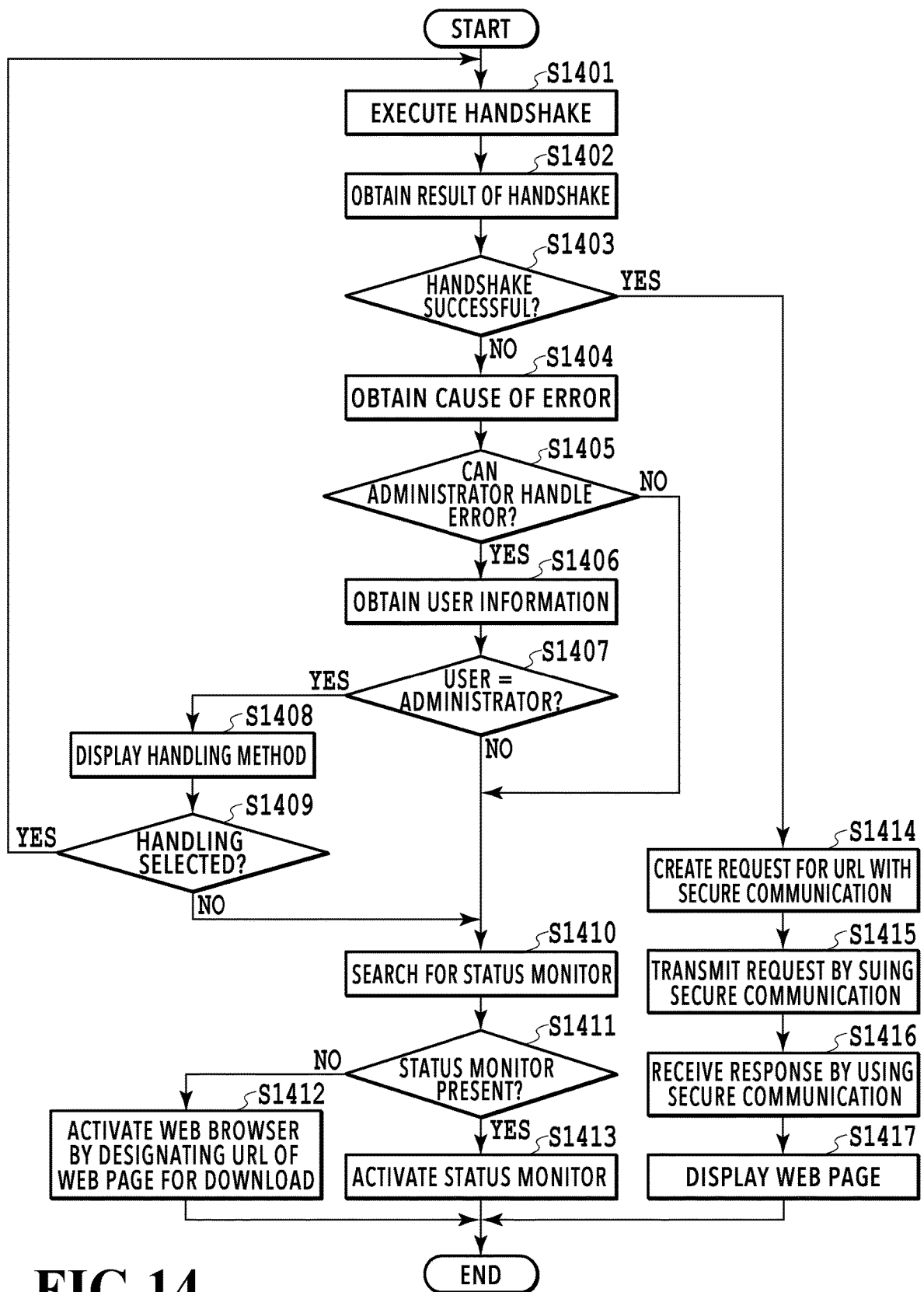
FIG. 14 is a diagram showing a flow in which the printer management unit activates the status monitor.

FIG. 14 is a diagram showing a flow in which the printer management unit 08 activates the printer management screen 40 or the status monitor 09 in the present embodiment. As with the Embodiment 1, in the case where the error notification unit 07 activates the printer management unit 08, the printer management unit 08 executes processing in accordance with this flow. Note that processing from S1401 to S1409 in FIG. 14 is the same as the processing from S701 to S709 of the Embodiment 1, and explanations will therefore be omitted. Likewise, processing from S1414 to S1417 is the same as the processing from S713 to S716 of the Embodiment 1, and explanations will therefore be omitted.

In S1410, the printer management unit 08 searches whether or not the status monitor 09 serving as the local application for displaying the status of the printer 20 is present in the PC 01. In the case where the printer management unit 08 determines in S1411 that the status monitor 09 is present as a result of the search, the processing proceeds to S1413 and the status monitor 09 is activated. Thereafter, this flow is terminated.

On the other hand, in the case where the status monitor 09 is determined to be absent as a result of the search, the processing proceeds to S1412 to activate the web browser 11 by designating the URL on the download web page 300, thus displaying the download web page 300. Here, in the case where the user presses the "start download" button 302 on the download web page 300, the status monitor 09 is downloaded on the PC 01, and the status monitor 09 displays the status screen 120 in the case where the user activates the status monitor 09. Thereafter, this flow is terminated. Although the present embodiment assumes that the user downloads and activates the status monitor 09, the printer management unit 08 may download and activate the status monitor 09 from a specific URL without activating the web browser 11.

As described above, according to the present embodiment, the status monitor 09 provided with the functions equivalent to those of the simplified version of the printer management web page is activated in the case where it is not possible to obtain the complete version of the printer management web page by using the secure communication. In this way, this configuration has an effect of a capability of providing the user with the equivalent functions even in the case where the printer 20 does not have the function to provide the simplified version of the printer management web page by using the unsecure communication.

While the present embodiment has described the processing to use the status monitor as an alternative procedure to replace S710 to S712 of the Embodiment 1 shown in FIG. 7, the present embodiment is also applicable to the flow of the Embodiment 2 shown in FIG. 10. The present embodiment can provide the alternative procedure for the processing to display the simplified version of the printer management web page by using the unsecure communication without limitations to the application to the Embodiments 1 and 2.

OTHER EMBODIMENTS

In the above-described embodiments, the printer management web page corresponding to the result of verification of the web certificate is displayed in the web page display area 42 on the printer management screen 40. However, it is also possible to manage the printer in accordance with a mode other than the display of the web page. For example, there may be a mode of causing the printer management unit 08 to obtain a content concerning the printer management from the web server depending on the result of verification of the web certificate, and to display the content on the printer management screen 40.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-214410, filed Dec. 28, 2021, which is hereby incorporated by reference herein in its entirety.

What is claimed is:

1. An information processing apparatus being communicable with a web server configured to provide a web page, comprising:
   at least one memory and at least one processor and/or at least one circuit which function as:
   a first obtaining unit configured to obtain a certificate of the web server;
   a verifying unit configured to verify the certificate; and
   a control unit configured to perform control,
   in a case that verification of the certificate by the verifying unit is successful, to establish secure communication with the web server and display a first screen which represents first information received from the web server via the secure communication, and
   in a case that verification of the certificate by the verifying unit is not successful, to establish unsecure communication with the web server and display a second screen which is different from the first screen and represents second information received from the web server via the unsecure communication,
   wherein a first selectable item about a specific apparatus and a second selectable item about the specific apparatus are displayed on the first screen, and
   wherein the first selectable item is displayed on the second screen but the second selectable item is not displayed on the second screen.

2. The information processing apparatus according to claim 1, wherein the control unit performs control,
   in a case the verification of the certificate by the verifying unit is successful, to obtain the first information from the web server via the secure communication by designating a first URL, and
   in a case verification of the certificate by the verifying unit is unsuccessful, to obtain the second information from the web server via the unsecure communication by designating a second URL.

3. The information processing apparatus according to claim 1, wherein
   the first screen represents the first information about a specific apparatus, and the second screen represents the second information about the specific apparatus and has fewer acceptable instructions than the first screen.

4. The information processing apparatus according to claim 1, wherein the at least one memory and the at least one processor and/or the at least one circuit further function as a second obtaining unit configured to obtain account information on a user, wherein
in a case where the verification of the certificate by the verifying unit is unsuccessful and the account information obtained by the second obtaining unit represents an administrator, the control unit performs control to display a method of handling the unsuccessful verification.

5. The information processing apparatus according to claim 4, wherein
in a case of carrying out an operation against the handling method by refusing to implement the handling method, the control performs control to establish the unsecure communication with the web server.

6. The information processing apparatus according to claim 1,
wherein the specific apparatus is a printing apparatus comprising the web server,
the first selectable item is an item to provide an instruction to display a status of the printing apparatus or an item to provide an instruction to display remaining amounts of respective inks loaded in the printing apparatus, and
wherein the second selectable item is an item to provide an instruction to execute maintenance of the printing apparatus or an item to provide an instruction to set an operation mode of the printing apparatus.

7. The information processing apparatus according to claim 6,
wherein the first selectable item is the item to provide the instruction to display the status, and
wherein based on the first selectable item being selected, at least one of information on a sheet loaded in the printing apparatus and a detail of an error in a case where the error occurs in the printing apparatus and a solution for the error is displayed.

8. The information processing apparatus according to claim 6,
wherein the second selectable item is the item to provide the instruction to execute the maintenance, and
wherein the maintenance is processing including at least one of head cleaning for clearance of a clogged ink and print head position adjustment for improvement of displacement of a printing position.

9. The information processing apparatus according to claim 6,
wherein the second selectable item is the item to provide the instruction to set the operation mode, and
wherein based on the second selectable item being selected, at least one of setting in such a way as to automatically turn the printing apparatus on in a case where the printing apparatus receives print data and setting in such a way as to reduce an operating sound while the printing apparatus performs printing can be performed.

10. The information processing apparatus according to claim 1,
wherein the first screen and the second screen are both displayed according to a specific operation on the information processing apparatus from a user.

11. An information processing apparatus being communicable with a web server configured to provide a web page, comprising:
at least one memory and at least one processor and/or at least one circuit which function as:
a first obtaining unit configured to obtain account information on a user of the web server; and a control unit configured to perform control,
in a case the obtained account information represents an administrator and verification of a certificate obtained from the web server is successful, to establish secure communication with the web server and display a first screen which represents first information received from the web server via the secure communication, and
in a case the obtained account information does not represent an administrator, to establish unsecure communication with the web server and display a second screen which is different from the first screen and represents second information received from the web server via the unsecure communication,
wherein a first selectable item about a specific apparatus and a second selectable item about the specific apparatus are displayed on the first screen, and
wherein the first selectable item is displayed on the second screen but the second selectable item is not displayed on the second screen.

12. The information processing apparatus according to claim 11, wherein the at least one memory and the at least one processor and/or the at least one circuit further function as:
a second obtaining unit configured to obtain the certificate of the web server; and
a verifying unit configured to verify the certificate.

13. The information processing apparatus according to claim 12, wherein the control unit performs control
in a case the obtained account information represents an administrator and verification of the certificate obtained from the web server is successful, to obtain the first information from the web server via the secure communication by designating a first URL, and
in a case the obtained account information does not represent an administrator, to obtain the second information from the web server via the unsecure communication by designating a second URL.

14. The information processing apparatus according to claim 12, wherein
in a case where the account information obtained by the first obtaining unit represents the administrator and the verifying unit fails in the verification, the information processing apparatus determines whether or not the administrator is capable of handling an unsuccessful verification, and controls display of a handling method in the case where the administrator is capable of handling the failure in the verification.

15. The information processing apparatus according to claim 11, wherein
the first screen represents the first information about a specific apparatus, and
the second screen represents the second information about the specific apparatus and has fewer acceptable instructions than the first screen.

16. The information processing apparatus according to claim 11,
wherein the specific apparatus is a printing apparatus comprising the web server,
the first selectable item is an item to provide an instruction to display a status of the printing apparatus or an item to provide an instruction to display remaining amounts of respective inks loaded in the printing apparatus, and wherein the second selectable item is an item to provide an instruction to execute maintenance of the printing apparatus or an item to provide an instruction to set an operation mode of the printing apparatus.

17. The information processing apparatus according to claim 16, wherein the first selectable item is the item to provide the instruction to display the status, and wherein based on the first selectable item being selected, at least one of information on a sheet loaded in the printing apparatus and a detail of an error in a case where the error occurs in the printing apparatus and a solution for the error is displayed.

18. The information processing apparatus according to claim 16, wherein the second selectable item is the item to provide the instruction to execute the maintenance, and wherein the maintenance is processing including at least one of head cleaning for clearance of a clogged ink and print head position adjustment for improvement of displacement of a printing position.

19. The information processing apparatus according to claim 16, wherein the second selectable item is the item to provide the instruction to set the operation mode, and wherein based on the second selectable item being selected, at least one of setting in such a way as to automatically turn the printing apparatus on in a case where the printing apparatus receives print data and setting in such a way as to reduce an operating sound while the printing apparatus performs printing can be performed.

20. The information processing apparatus according to claim 11, wherein the first screen and the second screen are both displayed according to a specific operation on the information processing apparatus from a user.

21. An information processing apparatus being communicable with a web server configured to provide a web page, comprising:

at least one memory and at least one processor and/or at least one circuit which function as:

a first obtaining unit configured to obtain a certificate of the web server;

a verifying unit configured to verify the certificate;

a control unit configured to perform control, in a case that verification of the certificate by the verifying unit is successful, to establish secure communication with the web server and display a first screen which represents first information about a specific apparatus received from the web server via the secure communication, and in a case that verification of the certificate by the verifying unit is unsuccessful, to search whether or not the information processing apparatus is provided with a specific application software, different from a web browser, configured to enable checking of a status of the specific apparatus; and an activating unit configured to activate the specific application software in a case where the searching for the specific application software is successful, wherein a first selectable item about a specific apparatus and a second selectable item about the specific apparatus are displayed on the first screen, wherein the specific apparatus is a printing apparatus comprising the web server, wherein the first selectable item is an item to provide an instruction to display a status of the printing apparatus or an item to provide an instruction to display remaining amounts of respective inks loaded in the printing apparatus, and wherein the second selectable item is an item to provide an instruction to execute maintenance of the printing apparatus or an item to provide an instruction to set an operation mode of the printing apparatus.

22. The information processing apparatus according to claim 21, wherein the at least one memory and the at least one processor and/or the at least one circuit further function as:

a second activating unit configured to activate the web browser in order to download the specific application software in a case where the searching unit fails in searching for the specific application software.

23. The information processing apparatus according to claim 21, wherein the first screen represents the first information about a specific apparatus, and a screen of the specific application software represents information about the specific apparatus and has fewer acceptable instructions than the first screen.

24. A non-transitory computer readable storage medium storing a program which causes a computer to be operable in an information processing apparatus and to be communicable with a web server configured to provide a web page, wherein the program causes the computer to:

obtain a certificate of the web server;

verify the certificate; and perform control, in a case that verification of the certificate is successful, to establish secure communication with the web server and display a first screen which represents first information received from the web server via the secure communication, and in a case that verification of the certificate is not successful, to establish unsecure communication with the web server and display a second screen which is different from the first screen and represents second information received from the web server via the unsecure communication, wherein a first selectable item about a specific apparatus and a second selectable item about the specific apparatus are displayed on the first screen, and wherein the first selectable item is displayed on the second screen but the second selectable item is not displayed on the second screen.

25. A method of controlling an information processing apparatus being communicable with a web server configured to provide a web page, comprising:

obtaining a certificate of the web server;

verifying the certificate; and in a case that verification of the certificate is successful, establishing secure communication with the web server and displaying a first screen which represents first information received from the web server via the secure communication, in a case that verification of the certificate is not successful, establishing unsecure communication with the web server and displaying a second screen which is different from the first screen and represents second information received from the web server via the unsecure communication, wherein a first selectable item about a specific apparatus and a second selectable item about the specific apparatus are displayed on the first screen, and wherein the first selectable item is displayed on the second screen but the second selectable item is not displayed on the second screen.

26. A non-transitory computer readable storage medium storing a program which causes a computer to be operable in an information processing apparatus and to be communicable with a web server configured to provide a web page, wherein the program causes the computer to: obtain account information on a user of the web server; and perform control in a case the obtained account information represents an administrator and verification of a certificate obtained from the web server is successful, to establish secure communication with the web server and display a first screen which represents first information received from the web server via the secure communication, and in a case the obtained account information does not represent an administrator, to establish unsecure communication with the web server and display a second screen which is different from the first screen and represents second information received from the web server via the unsecure communication, wherein a first selectable item about a specific apparatus and a second selectable item about the specific apparatus are displayed on the first screen, and wherein the first selectable item is displayed on the second screen but the second selectable item is not displayed on the second screen.

27. A method of controlling an information processing apparatus being communicable with a web server configured to provide a web page, comprising:

obtaining account information on a user of the web server; and in a case the obtained account information represents an administrator and verification of a certificate obtained from the web server is successful, establishing secure communication with the web server and displaying a first screen which represents first information received from the web server via the secure communication, and in a case that the obtained account information does not represent an administrator, establishing unsecure communication with the web server and displaying a second screen which is different from the first screen and represents second information received from the web server via the unsecure communication, wherein a first selectable item about a specific apparatus and a second selectable item about the specific apparatus are displayed on the first screen, and wherein the first selectable item is displayed on the second screen but the second selectable item is not displayed on the second screen.

28. A non-transitory computer readable storage medium storing a program which causes a computer to be operable in an information processing apparatus and to be communicable with a web server configured to provide a web page, wherein the program causes the computer to: obtain a certificate of the web server;

verify the certificate; and perform control, in a case that verification of the certificate is successful, to establish secure communication with the web server and display a first screen which represents first information about a specific apparatus received from the web server via the secure communication, and in a case that verification of the certificate is not successful, to search whether or not the information processing apparatus is provided with a specific application software, different from a web browser, being capable of checking a status of the specific apparatus; and an activating unit configured to activate the specific application software in a case where the searching for the specific application software is successful, wherein a first selectable item about a specific apparatus and a second selectable item about the specific apparatus are displayed on the first screen, wherein the specific apparatus is a printing apparatus comprising the web server, wherein the first selectable item is an item to provide an instruction to display a status of the printing apparatus or an item to provide an instruction to display remaining amounts of respective inks loaded in the printing apparatus, wherein the second selectable item is an item to provide an instruction to execute maintenance of the printing apparatus or an item to provide an instruction to set an operation mode of the printing apparatus.

29. A method of controlling an information processing apparatus being communicable with a web server configured to provide a web page, comprising:

obtaining a certificate of the web server;

verifying the certificate; and performing control, in a case that verification of the certificate by the verifying unit is successful, to establish secure communication with the web server and display a first screen which represents first information about a specific apparatus received from the web server via the secure communication, and in a case that verification of the certificate is not successful, to search whether or not the information processing apparatus is provided with a specific application software, different from a web browser, being capable of checking a status of the specific apparatus; and activating the specific application software in a case where the status monitor is successfully searched, wherein a first selectable item about a specific apparatus and a second selectable item about the specific apparatus are displayed on the first screen, wherein the specific apparatus is a printing apparatus comprising the web server, wherein the first selectable item is an item to provide an instruction to display a status of the printing apparatus or an item to provide an instruction to display remaining amounts of respective inks loaded in the printing apparatus, wherein the second selectable item is an item to provide an instruction to execute maintenance of the printing apparatus or an item to provide an instruction to set an operation mode of the printing apparatus.

* * * * *